(12) United States Patent
Chen et al.

(10) Patent No.: US 8,625,041 B2
(45) Date of Patent: Jan. 7, 2014

(54) ARRAY SUBSTRATE, LIQUID CRYSTAL DISPLAY FOR THE SAME AND MANUFACTURING METHOD THEREOF

(75) Inventors: Yung-Fu Chen, Tainan (TW);
Rong-Bing Wu, Kaohsiung (TW);
Po-Hsiao Chen, Yunlin County (TW);
Chien-Hao Wu, Tainan (TW)

(73) Assignee: Hannstar Display Corporation, New Taipei (TW)

( * ) Notice: Subject to any disclaimer, the term of this patent is extended or adjusted under 35 U.S.C. 154(b) by 56 days.

(21) Appl. No.: 13/355,488

(22) Filed: Jan. 21, 2012

(65) Prior Publication Data
US 2013/0114032 A1 May 9, 2013

(30) Foreign Application Priority Data
Nov. 7, 2011 (TW) .............................. 100140627 A

(51) Int. Cl.
*G02F 1/1333* (2006.01)
(52) U.S. Cl.
USPC .............................. 349/54; 349/141; 349/152
(58) Field of Classification Search
None
See application file for complete search history.

(56) References Cited

U.S. PATENT DOCUMENTS

| 5,378,982 A | 1/1995 | Feigenbaum et al. |
| 6,521,475 B1 * | 2/2003 | Chen et al. ..................... 438/34 |
| 7,545,463 B2 | 6/2009 | Park |
| 2002/0131009 A1 * | 9/2002 | Takeuchi ..................... 349/153 |
| 2007/0024775 A1 * | 2/2007 | Lee et al. ..................... 349/110 |

* cited by examiner

*Primary Examiner* — Richard Kim
(74) *Attorney, Agent, or Firm* — Cheng-Ju Chiang

(57) ABSTRACT

An array substrate, liquid crystal display for the same and manufacturing method thereof are described. The array substrate includes a substrate, a plurality of scan lines, a plurality of data lines, a plurality of contact pads, a passivation layer and transparent conducting layer. The substrate has a first display region, a second display region and a first non-display region. The contact pads are disposed in the first non-display region. The transparent conducting layer disposed in the passivation layer includes a first pixel electrode, a second pixel electrode and a plurality of comb electrode. The first pixel electrode and second pixel electrode are disposed in the first display region and the second display region wherein the widths of the first pixel electrodes either are equal to or approximate the widths of the second pixel electrodes. The comb electrodes are disposed in the first non-display region and connected to the contact pads.

19 Claims, 19 Drawing Sheets

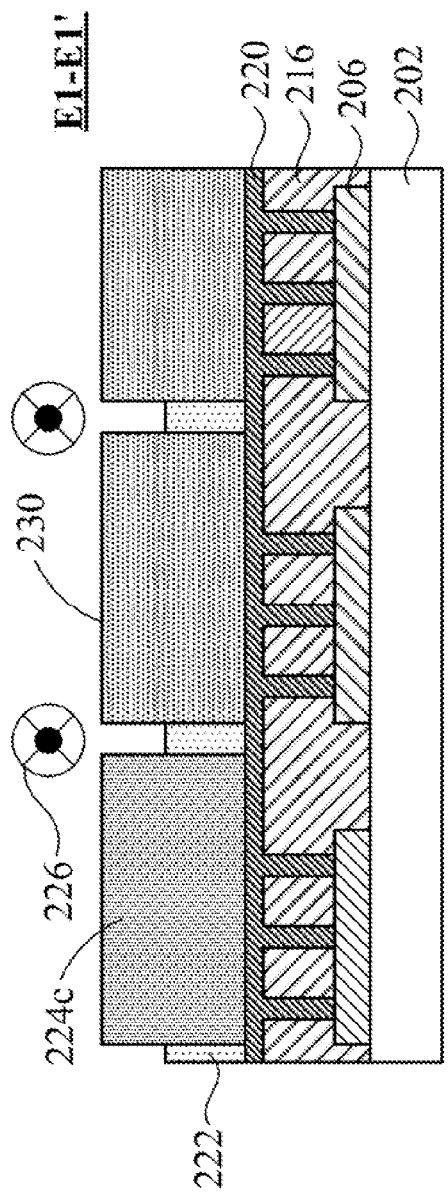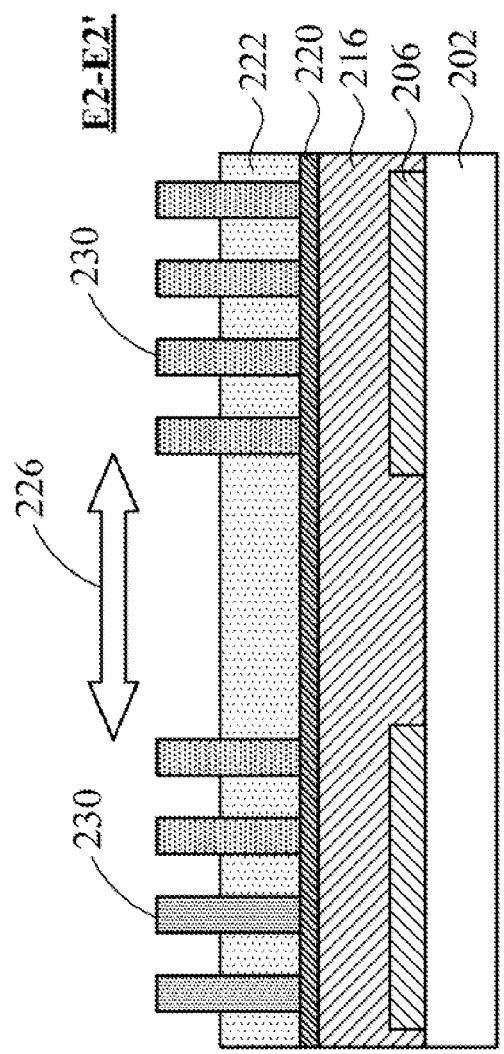

ARRAY SUBSTRATE, LIQUID CRYSTAL DISPLAY FOR THE SAME AND MANUFACTURING METHOD THEREOF

FIELD OF THE INVENTION

The present invention relates to an array structure and method thereof, and more particularly to an array substrate, liquid crystal display (LCD) with the array substrate and the manufacturing method thereof.

BACKGROUND OF THE INVENTION

Generally, a liquid crystal display (LCD) mainly includes a transmissive type LCD, a reflective type LCD, and a semi-transmissive/semi-reflective type LCD. The transmissive type LCD has a backlight module, and the light source of the backlight module may be cold cathode fluorescent lamps (CCFLs), hot cathode fluorescent lamp (HCFLs), light emitting diodes (LEDs), or electro luminescent (EL) devices. Currently, the CCFL is widely used in most LCDs.

The rotation uniformity of liquid crystal in the LCD panel affects the display quality of LCD panel. That is, if the rotation operation of liquid crystal is consistent, the display quality of the LCD panel can be improved. However, the rotation operation of liquid crystal is not enough, the light transmittance is decreased so that the brightness of the display region is reduced and the mura is disadvantageously generated in the display region. Specifically, the rotation operation of liquid crystal is relative to the electrical field of the pixel electrode determined by applying voltage. In other words, the electrical filed is increased and the rotation uniformity is better; however, the electrical filed is decreased and the rotation uniformity is reduced. Further, the magnitude of the electrical field is proportional to the line width of the pixel electrode. Conventionally, while performing a manufacturing process of LCD panel, film deposition step, yellow light and exposure step, developing step and lithography etching step are used to form the pixel electrodes within the LCD panel. Moreover, it is necessary to form the probe metal region with a bigger area around the periphery of LCD panel for inputting detection signals.

However, since the developer flow is directional to specific orientation, the recesses between the photoresist regions with bigger area speed up the flow velocity of the developer to the pixel electrode within the LCD panel so that the exposure pattern of pixel electrode is over-developed or under-developed. When the exposure pattern of pixel electrode is over-developed, the line width of the pixel electrode is considerably shrunk in relative to a specific width if the proceeding etching step is performed. When the exposure pattern of pixel electrode is under-developed, the line width of the pixel electrode is considerably increased in relative to the specific width if the proceeding etching step is performed. The deviation of line width of the pixel electrode results in the unstable electrical field generated by the pixel electrode. The rotation uniformity of liquid crystal in the LCD panel is downgraded and affects the display quality of the LCD panel. Consequently, there is a need to develop a novel structure to solve the aforementioned problems.

SUMMARY OF THE INVENTION

The first objective of the present invention is to provide an array substrate, liquid crystal display (LCD) with the array substrate and the manufacturing method thereof. While a developing step is performed on manufacturing process of the LCD panel, the developer uniformly flow on the exposure patterns for equalizing the line widths of the pixel electrodes so as to prevent the developer concentration to solve the problem of mura, i.e. unbalanced brightness, in the LCD panel.

According to the above objective, the present invention sets forth the array substrate, liquid crystal display (LCD) with the array substrate and the manufacturing method thereof.

In a first embodiment of the present invention, an array substrate includes:

a substrate having a first display region, a second display region and a first non-display region;

a plurality of bottom contact pads disposed on the first non-display region of the substrate;

a passivation layer disposed on the substrate for covering the bottom contact pads;

a transparent conducting layer disposed on the passivation layer and having a plurality of top contact pads disposed in the first non-display region and electrically connected to the bottom contact pads;

wherein each of the top contact pads comprises:

a main body; and a plurality of comb portions extending from the main body.

Specifically, the array substrate further includes a plurality of scan lines disposed on the first display region and the second display region of the substrate, and a plurality of data lines disposed on the first display region and the second display region. The passivation layer further comprises a plurality of via holes corresponding to the bottom contact pads. The transparent conducting layer fills the via holes. The top contact pads are insulated each other. The bottom contact pads are insulated each other.

The transparent conducting layer further includes a first pixel electrode and a first common electrode disposed on the first display region, and further includes a second pixel electrode and a second common electrode disposed on the second display region. In various embodiments, the transparent conducting layer further comprises a first wall remainder disposed between the first pixel electrode, the first common electrode and the top contact pads. The transparent conducting layer further comprises a second wall remainder disposed around the top contact pads and near a side edge of the substrate. The transparent conducting layer further comprises a third wall remainder disposed between the top contact pads. The first pixel electrode and the first common electrode in the first display region correspond to the top contact pads in the first non-display region.

In a second embodiment of the present invention, an array substrate includes:

a substrate having a first display region, a second display region and a first non-display region;

a plurality of bottom contact pads disposed on the first non-display region of the substrate;

a passivation layer disposed on the substrate for covering the scan lines, the data lines, the transistors and the bottom contact pads; and a transparent conducting layer disposed on the passivation layer and having a plurality of top contact pads disposed in the first non-display region and electrically connected to the bottom contact pads;

wherein the transparent conducting layer further comprises a plurality of wall remainders interlaced with the top contact pads.

For example, each of the top contact pads further includes a main body and a plurality of comb portions. The main body is connected to one of the bottom contact pads. The comb portions extend from the main body for insulatedly interdigitating the comb portions in one top contact pad to the comb portions in another top contact pad.

In a third embodiment of the present invention, a liquid crystal display (LCD) panel includes:

an array substrate as the above-mentioned descriptions wherein either each of the top contact pads further comprises a plurality of comb portions or the transparent conducting layer further comprises a plurality of wall remainders interlaced with the top contact pads;

a bottom alignment layer disposed on the transparent conducting layer;

a color filter disposed above the substrate;

a top alignment layer disposed on the color filter; and a liquid crystal disposed between the bottom alignment layer and the top alignment layer.

In one case, each of the top contact pads includes a main body and the comb portions extending from the main body. In another case, the wall remainders insulatedly interlaced with the top contact pads are disposed between the first pixel electrode, the first common electrode and the top contact pads.

In a fourth embodiment, the manufacturing method of an array substrate includes the steps of:

forming a plurality of scan lines, a plurality of data lines, a plurality of transistors and a plurality of bottom contact pads on a substrate which defines a first display region, a second display region and a first non-display region, wherein the scan lines, the data lines and the transistors are disposed in the first display region and the second display region, the transistors are further disposed in a plurality of interlaced positions between the data lines and the scan lines respectively, and the bottom contact pads are disposed in the first non-display region;

forming a transparent conducting layer on the substrate;

forming a photoresist layer on the transparent conducting layer;

exposing the photoresist layer to define a first exposure pattern and a second exposure pattern on the first display region and the second display region and define a plurality of third exposure patterns corresponding to the bottom contact pads on the first non-display region;

performing a developing step when developer starts to flow on the exposed photoresist layer wherein a first line-width of the first exposure pattern is equal to or approximates a second line-width of the second exposure pattern;

forming a plurality of comb patterns and/or developer-resisting wall patterns by the third exposure patterns while the developer is in the flow process, wherein the comb patterns and/or developer-resisting wall patterns blocks a portion of the developer and the portion of developer flows from the top surfaces of the third exposure patterns and the comb patterns and/or developer-resisting wall patterns to the first exposure pattern of the first display region for changing the first line-width to be a third line-width, wherein another portion of developer directly flows to the second exposure pattern of the second display region for changing the second line-width to be a fourth line-width, and wherein the third line-width is equal to or approximates the fourth line-width; and forming a first pixel electrode and a first common electrode corresponding to the first exposure pattern and a second pixel electrode and a second common electrode corresponding to the second exposure pattern in the first display region and the second display region respectively, and forming a plurality of top contact pads corresponding to the first exposure pattern in the first non-display region.

The array substrate, liquid crystal display (LCD) with the array substrate and the manufacturing method thereof so that the developer uniformly flow on the exposure patterns for equalizing the line widths of the pixel electrodes to solve the problem of mura in the LCD panel.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7B is a schematic cross-sectional view of manufacturing process of the array substrate along line E1-E1' shown in FIG. 7A according to the first embodiment of the present invention;

FIG. 7C is a schematic cross-sectional view of manufacturing process of the array substrate along line E2-E2' shown in FIG. 7A according to the first embodiment of the present invention;

DETAILED DESCRIPTION OF THE PREFERRED EMBODIMENTS

Figure 1A:
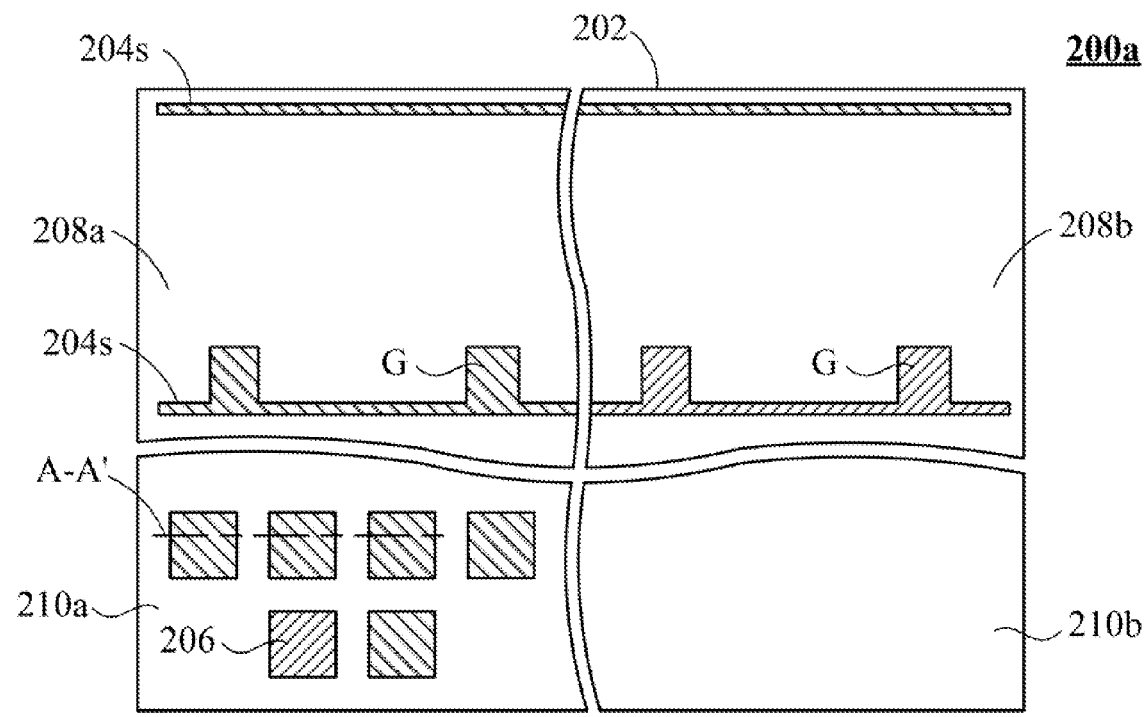
FIG. 1A is a schematic circuit layout view of forming the bottom contact pads on the array substrate according to a first embodiment of the present invention.
Figure 1B:
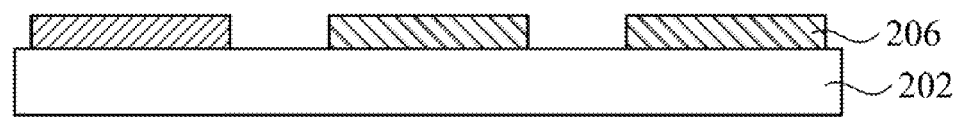
FIG. 1B is a schematic cross-sectional view of manufacturing process of the array substrate along line A-A' shown in FIG. 1A according to a first embodiment of the present invention.

FIG. 1A is a schematic circuit layout view of forming the bottom contact pads 206 on the array substrate 200a according to a first embodiment of the present invention. FIG. 1B is a schematic cross-sectional view of manufacturing process of the array substrate 200a along line A-A' shown in FIG. 1A according to a first embodiment of the present invention. A plurality of scan lines 204s, a plurality of gates G coupled to the scan lines 204s and a plurality of bottom contact pads 206. The substrate 202 defines a first display region 208a, a second display region 208b and a first non-display region 210a. The scan lines 204s are disposed in the first display region 208a and the second display region 208b and the bottom contact pads 206 are disposed in the first non-display region 210a.

In one embodiment, the metal or conducting layer of the scan lines 204s, gate G and bottom contact pads 206 is formed by lithography etching step and deposition step. The first display region 208a and the second display region 208b are arbitrary areas in the display region where two pixel units represent the first display region 208a and the second display region 208b respectively, but not limited, i.e. more than two pixel units can be regarded as the first display region 208a and the second display region 208b. The bottom contact pads 206 for electrical probe position are electrically insulated each other but can be selectively connected to the scan lines 204s for inputting scan detection signals to the first display region 208a and the second display region 208b via the scan lines 204s. The first non-display region 210a adjacent to the second non-display region 210b which has no bottom contact pad 206 wherein the first non-display region 210a corresponds to the first display region 208a and the second non-display region 210b corresponds to the second display region 208b. The first non-display region 210a and the second non-display region 210b are disposed around the periphery area of the array substrate 200a.

Figure 2:
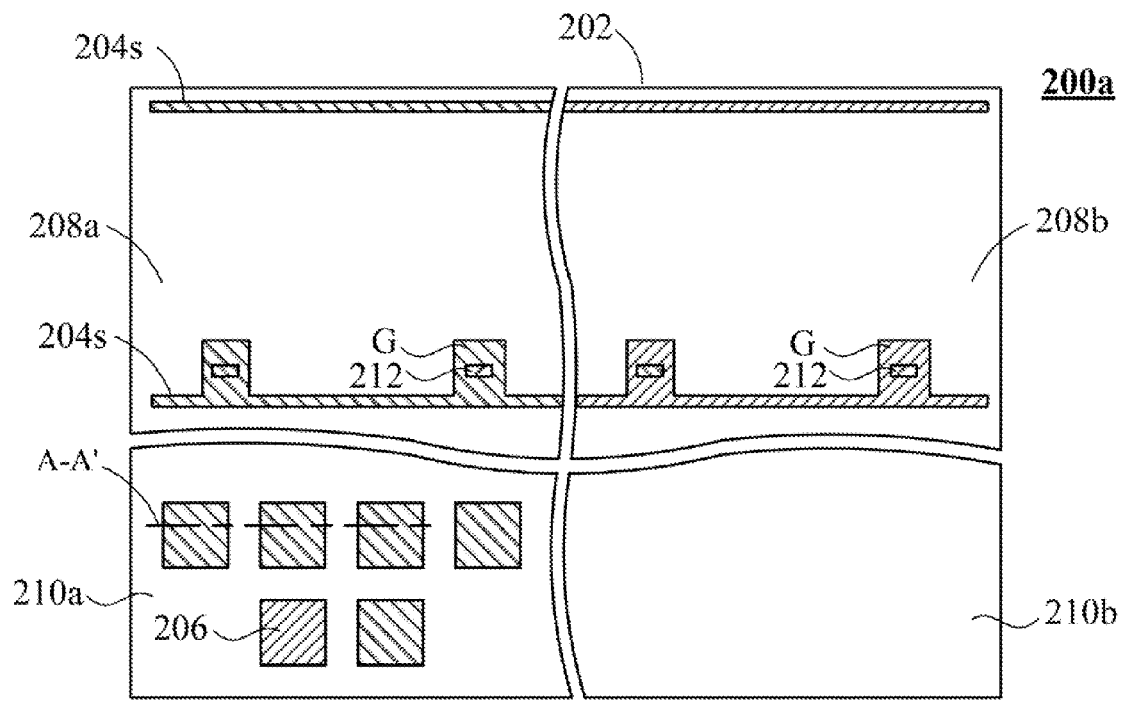
FIG. 2 is a schematic circuit layout view of forming the channel structure of the array substrate according to the first embodiment of the present invention.

FIG. 2 is a schematic circuit layout view of forming the channel structure 212 of the array substrate 200a according to the first embodiment of the present invention. A gate insulation layer (not shown) is formed on the first display region 208a and the second display region 208b for covering the scan lines 204s and gates G. A plurality of channel structures 212 corresponding to the gates G respectively are formed on the gate insulation layer. The cross-sectional view along line A-A' in FIG. 2 is depicted in FIG. 1B.

Figure 3:
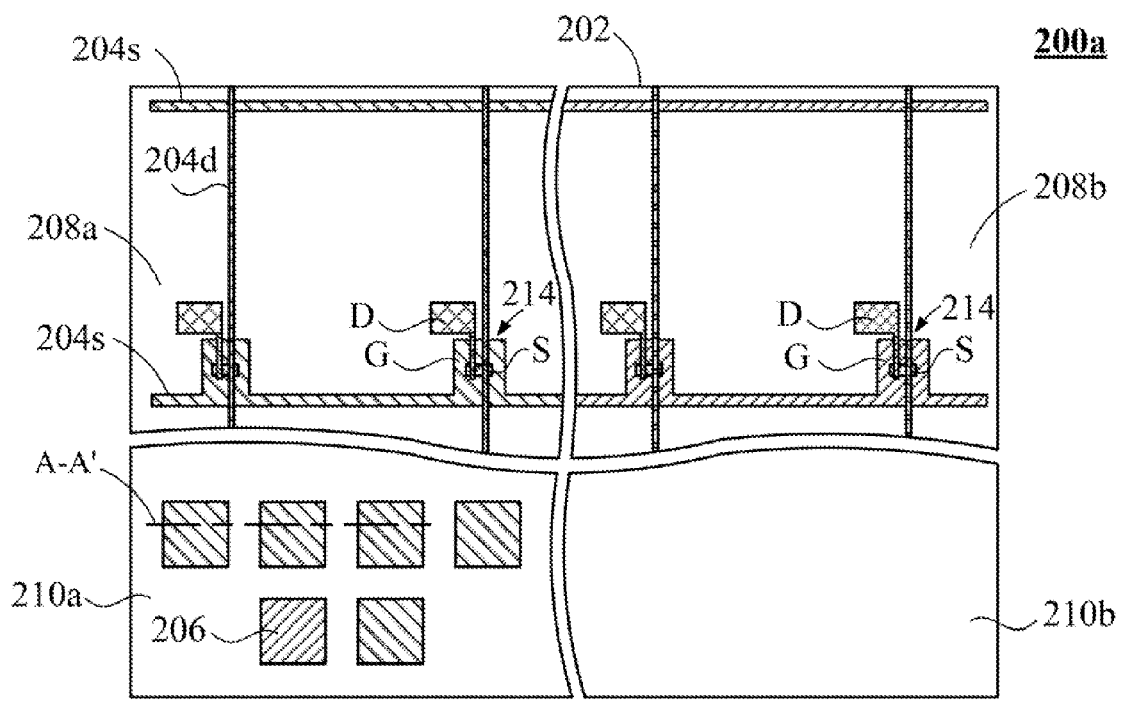
FIG. 3 is a schematic circuit layout view of forming the source and drain of the array substrate according to the first embodiment of the present invention.

FIG. 3 is a schematic circuit layout view of forming the sources S and drains D of the array substrate 200a according to the first embodiment of the present invention. A plurality of data lines 204d and a plurality of sources S and drains D coupled to data lines 204d are formed on the gate insulation layer. The gates G, channel structures 212, sources S and drains D form a plurality of transistors 214 disposed in a plurality of interlaced positions between the data lines 204d and the scan lines 204s respectively. The data lines 204d and the transistors 214 are disposed in the first display region 208a and the second display region 208b. For example, the metal or conducting layer of the data lines 204d, the sources S and drains D is formed by lithography etching step and deposition step.

In another embodiment, while the data lines 204d, the sources S and drains D are formed, another bottom contact pad (not shown) which has the same profile as the bottom contact pad 206 are simultaneously deposited on the bottom contact pad 206 so that the another bottom contact pad is overlapped on the bottom contact pad 206. Still another embodiment, another bottom contact pad replaces the bottom contact pad 206. The another bottom contact pad and/or bottom contact pads 206 for electrical probe position are electrically insulated each other but can be selectively connected to the scan lines 204s or data lines 204d for inputting scan detection signals to the first display region 208a and the second display region 208b via the scan lines 204s or data lines 204d. The cross-sectional view along line A-A' in FIG. 3 is depicted in FIG. 1B.

Figure 4A:
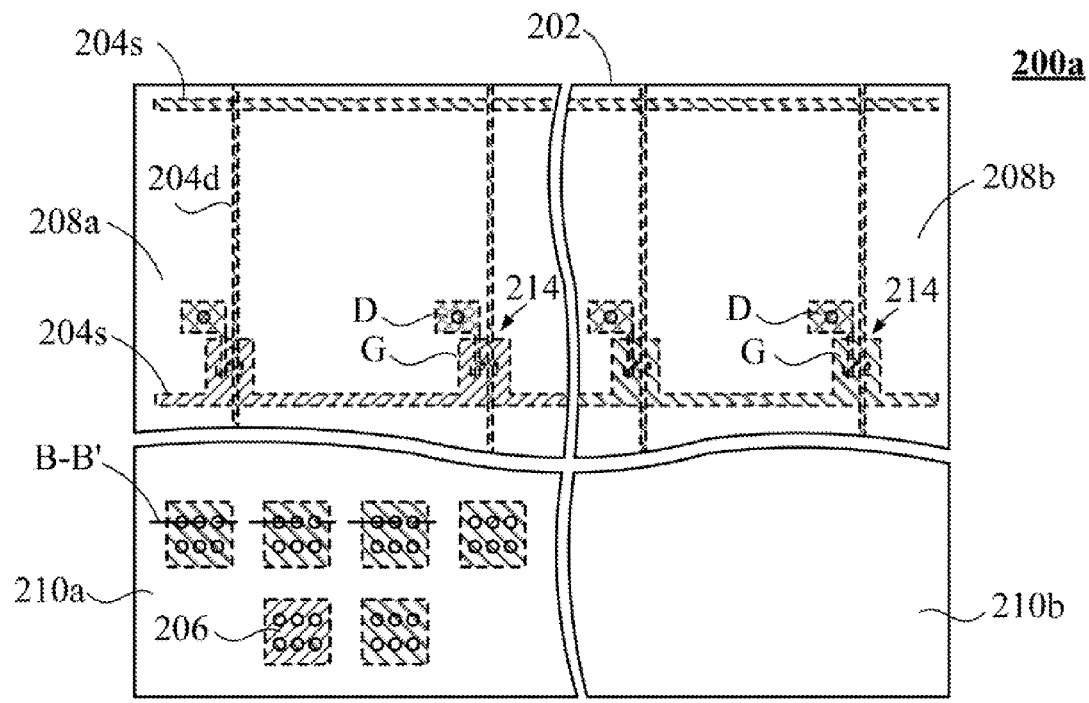
FIG. 4A is a schematic circuit layout view of forming the via holes of the array substrate according to the first embodiment of the present invention.
Figure 4B:
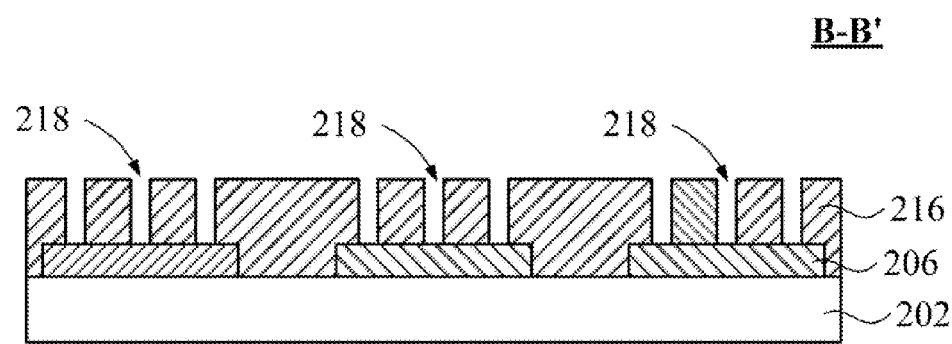
FIG. 4B is a schematic cross-sectional view of manufacturing process of the array substrate along line B-B' shown in FIG. 4A according to the first embodiment of the present invention.

FIG. 4A is a schematic circuit layout view of forming via holes 218 of the array substrate 200a according to the first embodiment of the present invention. FIG. 4B is a schematic cross-sectional view of manufacturing process of the array substrate 200a along line B-B' shown in FIG. 4A according to the first embodiment of the present invention. A passivation layer 216 is formed on the gate insulation layer, the first non-display region 210a and the second non-display region 210b for covering the data lines 204d, transistor 214 and the bottom contact pads 206. For example, the silicon oxide and silicon nitride of passivation layer 216 are formed by a deposition method. A plurality of via holes 218 are then formed in the passivation layer 216 for exposing a portion of drain D and a portion of bottom contact pad 206. The via holes 218 may be formed by lithography etching step.

Figure 5A:
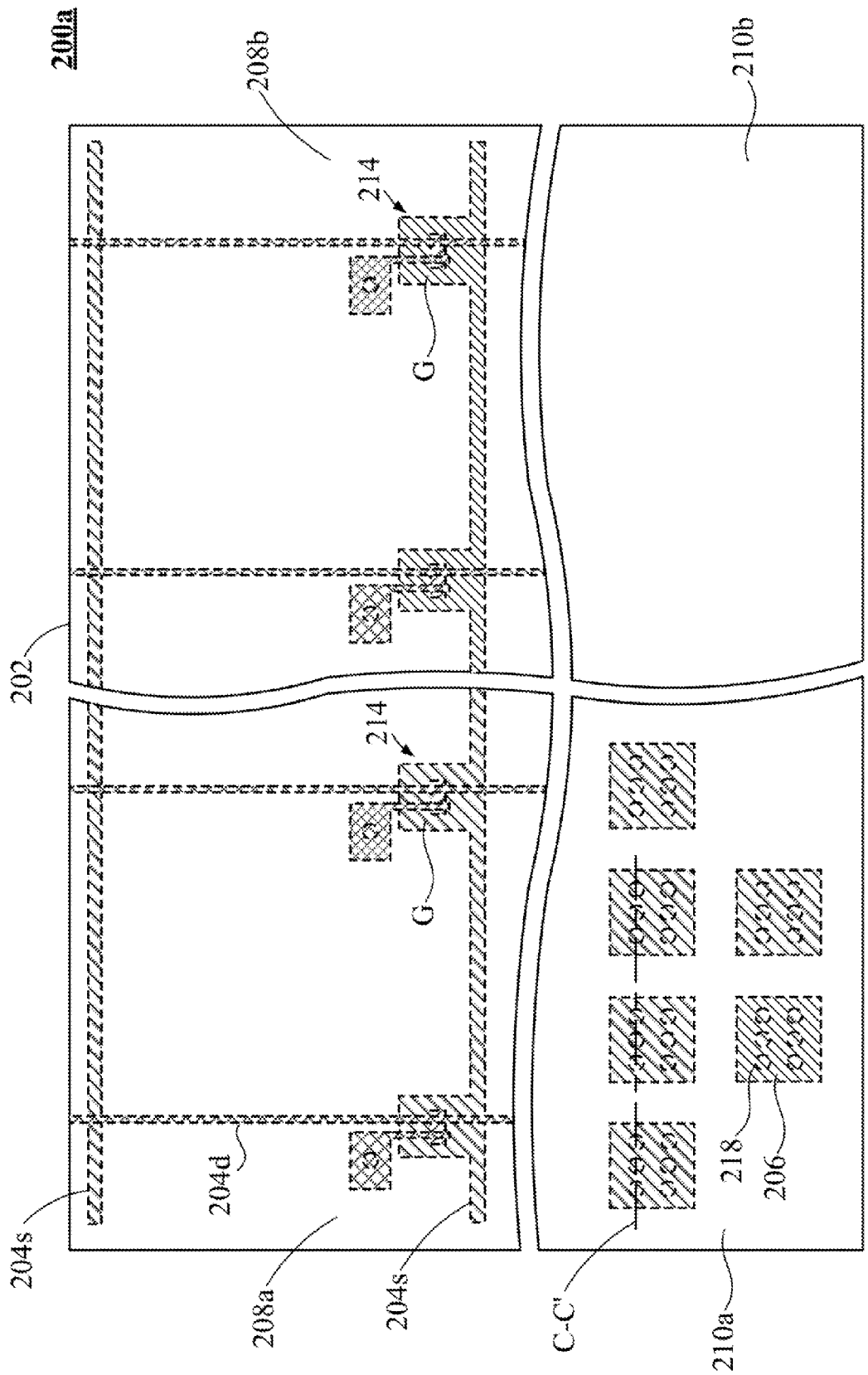
FIG. 5A is a schematic circuit layout view of forming the photoresist layer and the transparent conducting layer of the array substrate according to the first embodiment of the present invention.
Figure 5B:
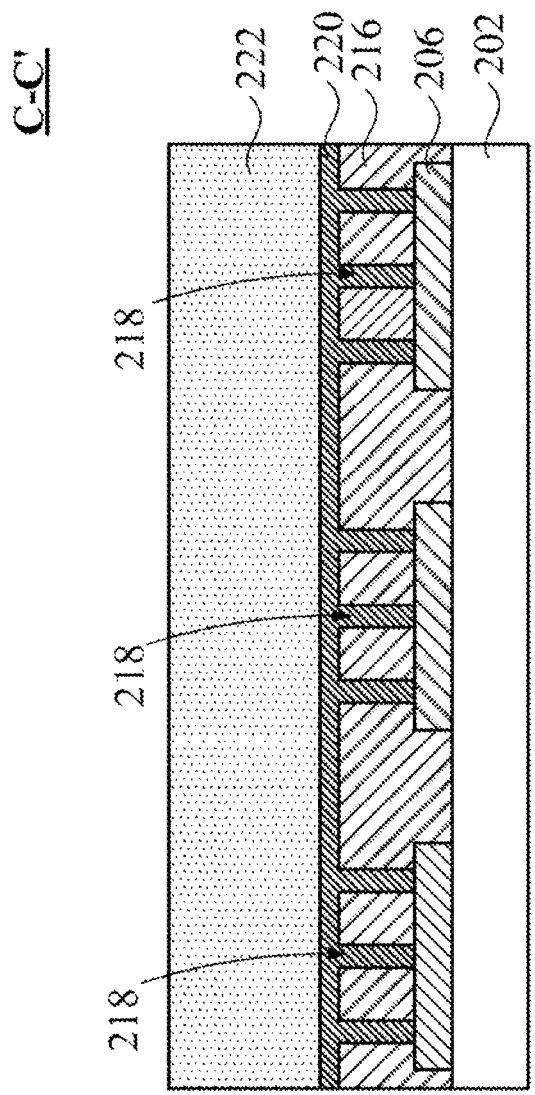
FIG. 5B is a schematic cross-sectional view of manufacturing process of the array substrate along line C-C' shown in FIG. 5A according to the first embodiment of the present invention.

FIG. 5A is a schematic circuit layout view of forming the photoresist layer 222 and the transparent conducting layer 220 of the array substrate 200a according to the first embodiment of the present invention. FIG. 5B is a schematic cross-sectional view of manufacturing process of the array substrate 200a along line C-C' shown in FIG. 5A according to the first embodiment of the present invention. The transparent conducting layer 220 is formed on the passivation layer 216 for covering the first display region 208a, the second display region 208b, the first non-display region 210a and the second non-display region 210b so that the transparent conducting layer 220 fills the via hole 218 and electrically connects to the bottom contact pads 206 and drains D (not shown). The photoresist layer 222 is coated on the transparent conducting layer 220 for covering the first display region 208a, the second display region 208b, the first non-display region 210a and the second non-display region 210b. For example, the material of transparent conducting layer 220 is Indium Tin Oxide (ITO) or Indium Zinc Oxide (IZO).

Figure 6A:
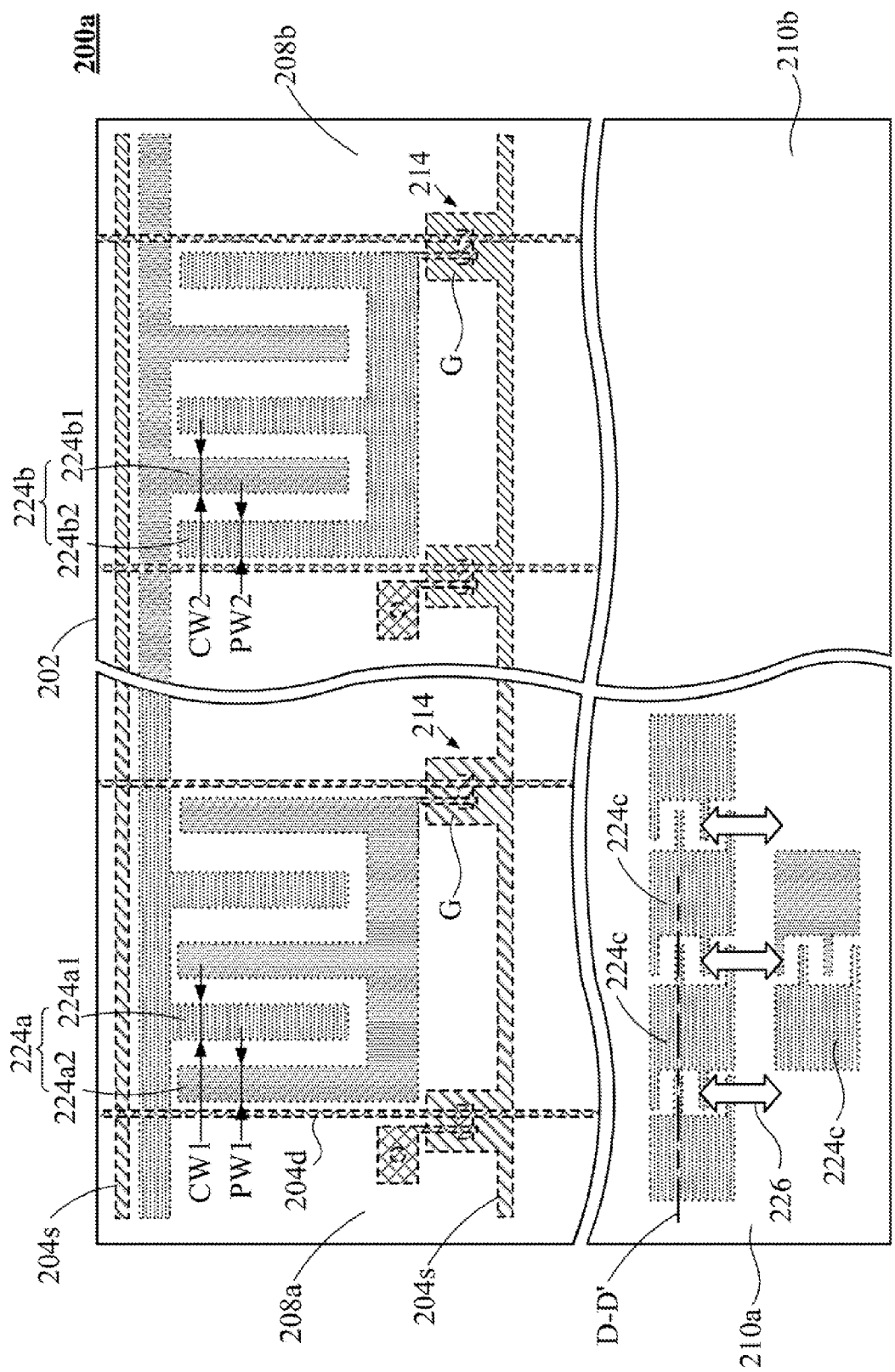
FIG. 6A is a schematic circuit layout view of exposing the photoresist layer of the array substrate according to the first embodiment of the present invention.
Figure 6B:
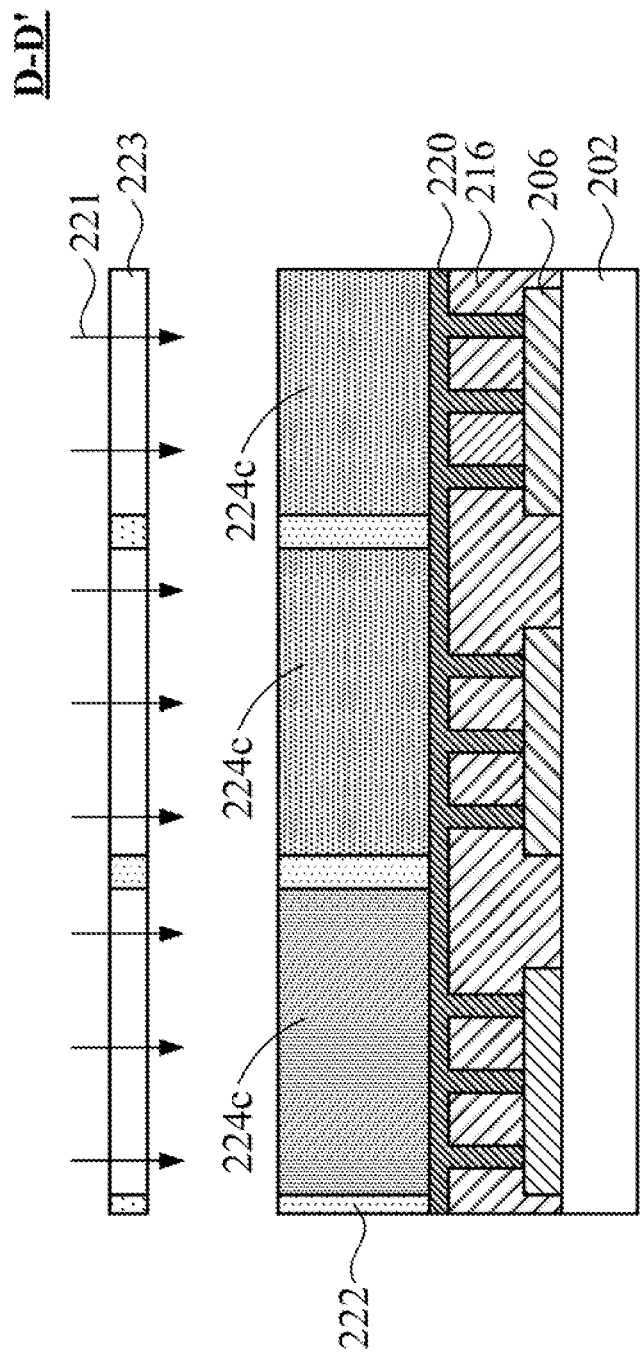
FIG. 6B is a schematic cross-sectional view of manufacturing process of the array substrate along line D-D' shown in FIG. 6A according to the first embodiment of the present invention.

FIG. 6A is a schematic circuit layout view of exposing the photoresist layer 222 of the array substrate 200a according to the first embodiment of the present invention. FIG. 6B is a schematic cross-sectional view of manufacturing process of the array substrate along line D-D' shown in FIG. 6A according to the first embodiment of the present invention. The ultra-violet light 221 and the mask 223 composed of a first exposure pattern 224a, a second exposure pattern 224b and third exposure patterns 224c are used to perform a exposure step on the photoresist layer 222 so that the first display region 208a defines the first exposure pattern 224a, the second display region 208b defines the second exposure pattern 224b and the first non-display region 210a defines the third exposure patterns 224c corresponding to the bottom contact pads 206. The first exposure pattern 224a in the first display region 208a includes a first common electrode exposure pattern 224a1 and a first pixel electrode exposure pattern 224a2 and the second exposure pattern 224b in the second display region 208b includes a second common electrode exposure pattern 224b1 and a second pixel electrode exposure pattern 224b2. The first pixel electrode exposure pattern 224a2 and second pixel electrode exposure pattern 224b2 respectively correspond to the drains D of the transistors 214.

While the developer is used to perform a developing step and starts to flow along direction 226 on the exposed photoresist layer 222, a first line-width of the first exposure pattern 224a is equal to or approximates a second line-width of the second exposure pattern 224b. For example, the first line-width PW1 of first pixel electrode exposure pattern 224a2 in the first display region 208a is equal to or approximates the second line-width PW2 of second pixel electrode exposure pattern 224b2 in the second display region 208b. Similarly, the first line-width CW1 of first common electrode exposure pattern 224a1 in the first display region 208a is equal to or approximates the second line-width CW2 of second common electrode exposure pattern 224b1 in the second display region 208b.

Figure 7A:
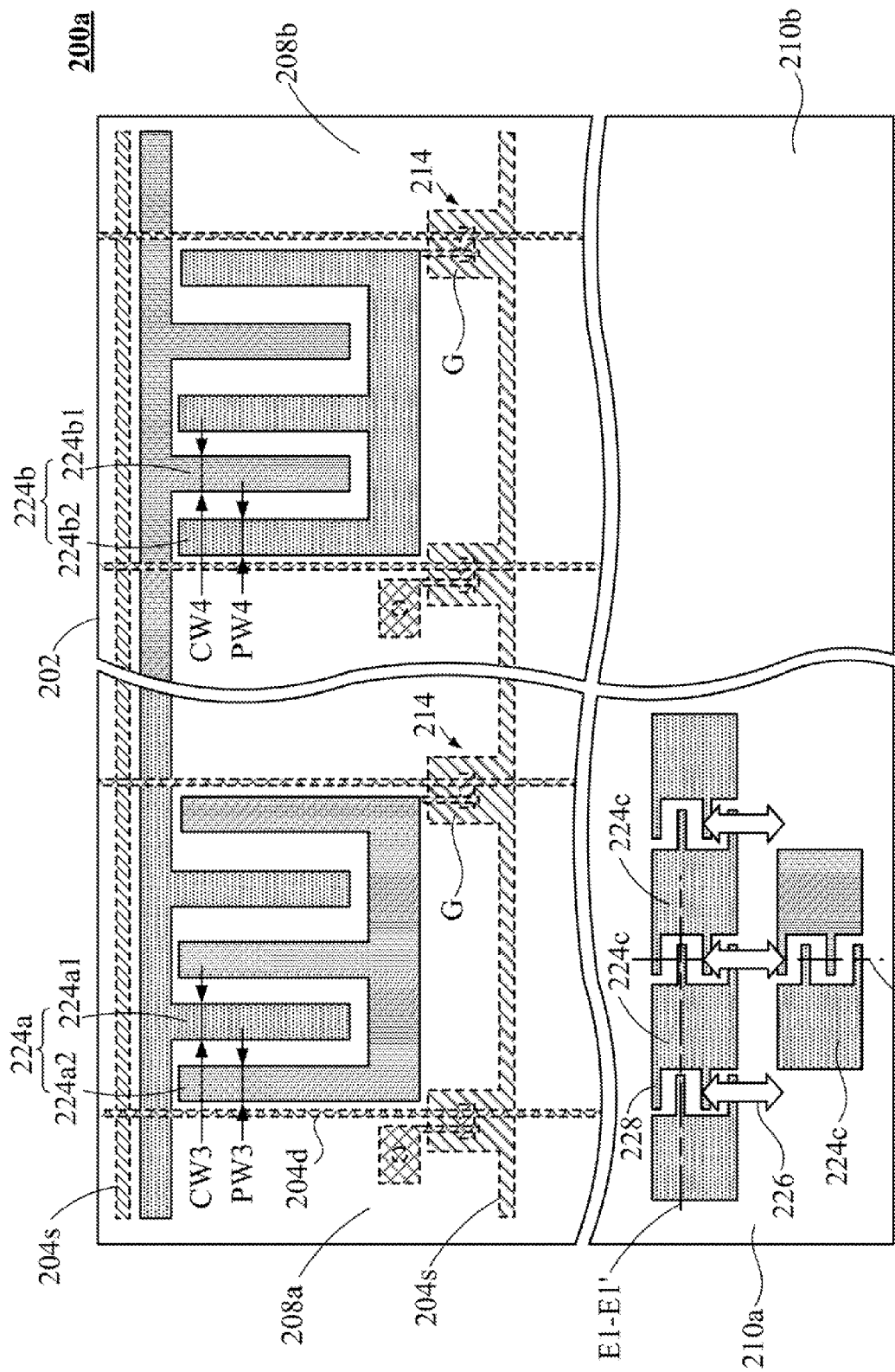
FIG. 7A is a schematic circuit layout view of a developing process of the array substrate according to the first embodiment of the present invention.

Please refer to FIGS. 7A, 7B and 7C. FIG. 7A is a schematic circuit layout view of a developing process of the array substrate 200a according to the first embodiment of the present invention. FIG. 7B is a schematic cross-sectional view of manufacturing process of the array substrate 200a along line E1-E1' shown in FIG. 7A according to the first embodiment of the present invention. FIG. 7C is a schematic cross-sectional view of manufacturing process of the array substrate 200a along line E2-E2' shown in FIG. 7A according to the first embodiment of the present invention. When the developer flows along the direction 226 during the developer movement process, each of the third exposure patterns 224c gradually forms a plurality of blocking patterns or comb patterns 228 wherein the comb pattern 228 in one third exposure pattern 224c is interdigitated to another comb pattern 228 in another third exposure pattern 224c. The comb patterns 228 blocks a portion of the developer and the portion of developer flows from the top surfaces 230 (as shown in FIG. 7B and FIG. 7C) of the third exposure patterns 224c and the comb patterns 228 to the first exposure pattern 224a of the first display region 208a for changing the first line-widths PW1, CW1 of first exposure pattern 224a to be third line-widths PW3, CW3 respectively. Further, another portion of developer directly flows to the second exposure pattern 224b of the second display region 208b for changing the second line-width of second exposure pattern 224b to be fourth line-widths PW4, CW4 wherein the third line-widths PW3, CW3 are equal to or approximate the fourth line-widths PW4, CW4 respectively.

In other words, during the developer flow process along the direction 226, the developer can uniformly flow from the top surfaces 230 of the third exposure patterns 224c and the comb patterns 228 because the comb patterns 228 slightly blocks the developer flow between two third exposure patterns 224c. Thus, the developer performs a developing step on the first line-widths PW1, CW1 of the first exposure pattern 224a to be changed as the third line-widths PW3, CW3 respectively; meanwhile, the developer also performs the developing step on the second line-widths PW1, CW1 of the second exposure pattern 224b to be changed as the fourth line-widths PW4, CW4 respectively. It should be noted that the developer flow direction 226 in FIG. 7B represents the direction into the page and out of the page and the developer flow direction 226 in FIG. 7C represents the direction along left side and right side back and forth.

Figure 8A:
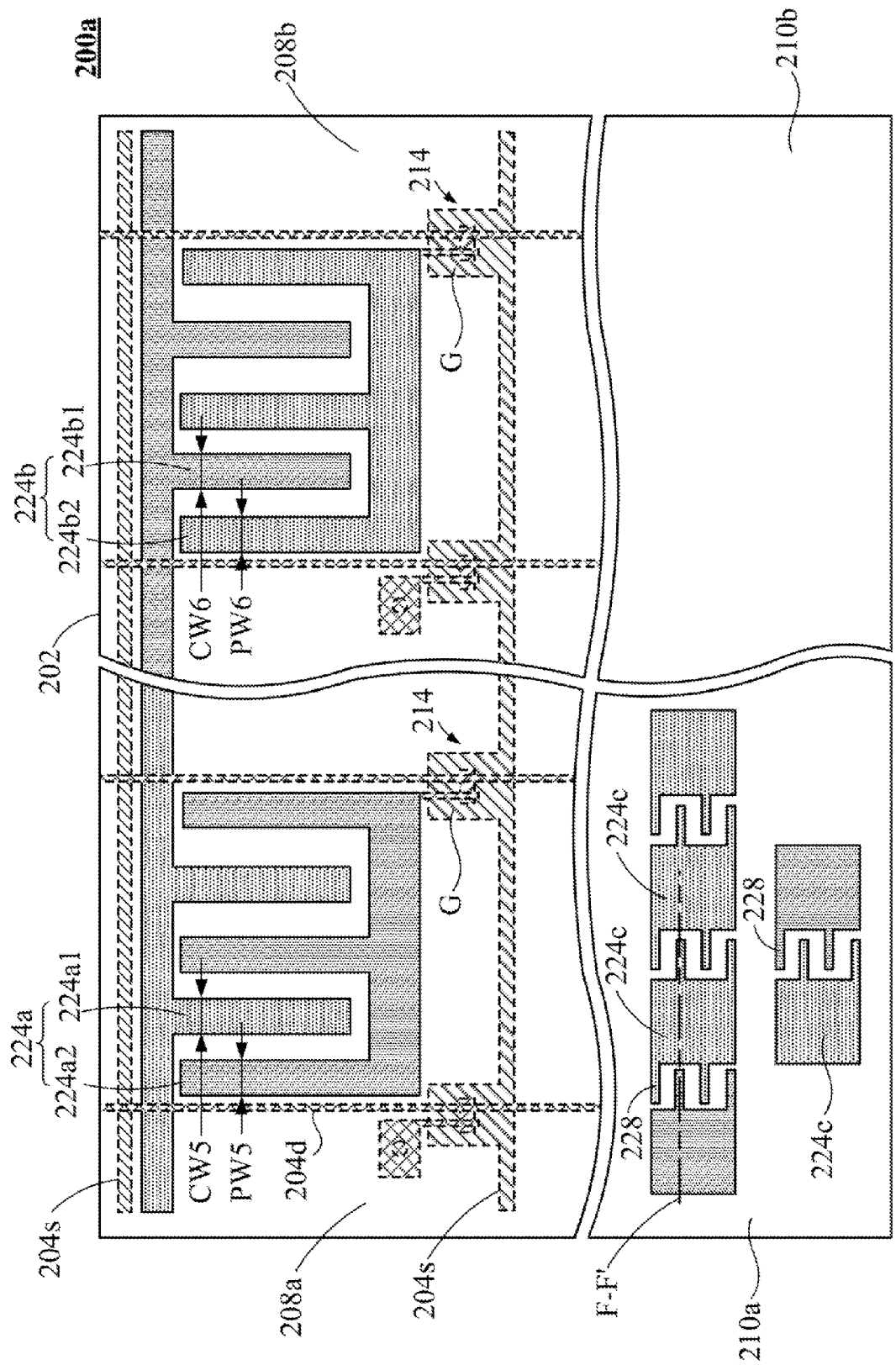
FIG. 8A is a schematic circuit layout view of completing the developing process of the array substrate according to the first embodiment of the present invention.
Figure 8B:
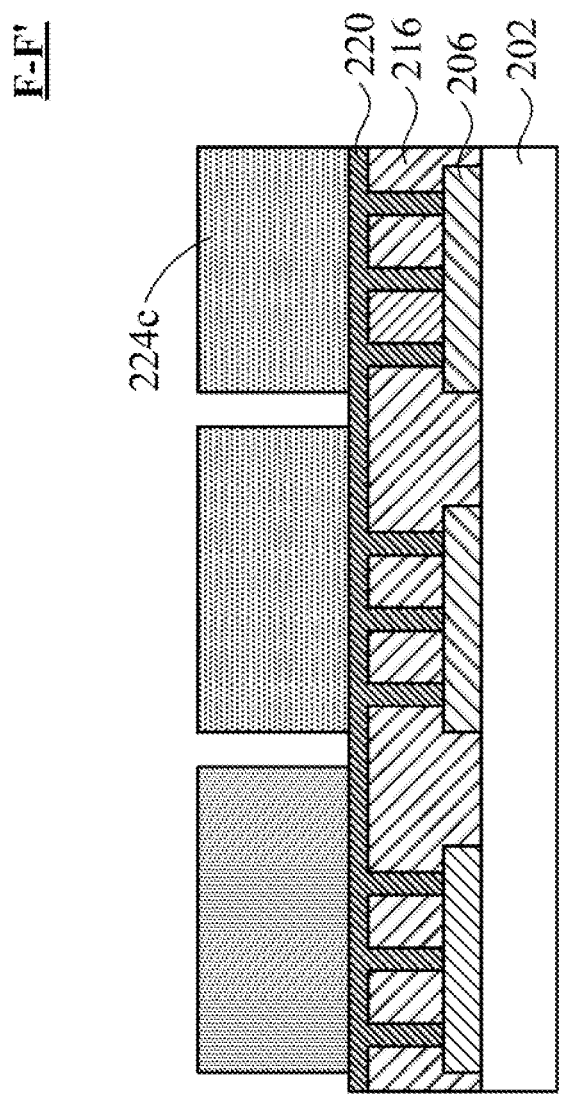
FIG. 8B is a schematic cross-sectional view of manufacturing process of the array substrate along line F-F' shown in FIG. 8A according to the first embodiment of the present invention.

FIG. 8A is a schematic circuit layout view of completing the developing process of the array substrate 200a according to the first embodiment of the present invention. FIG. 8B is a schematic cross-sectional view of manufacturing process of the array substrate along line F-F' shown in FIG. 8A according to the first embodiment of the present invention. The third line-widths PW3, CW3 of first exposure pattern 224a are changed to fifth line-widths PW5, CW5 respectively of the first exposure pattern 224a and the fourth line-widths PW4, CW4 to sixth line-widths PW6, CW6 respectively of the second exposure pattern 224b after completing the developing step, wherein the fifth line-widths PW5, CW5 are equal to or approximate the sixth line-widths PW6, CW6 respectively and a portion of transparent conducting layer 220 is exposed. That is, after completing the developing step, the fifth line-widths PW5, CW5 of first exposure pattern 224a are equal to or approximate the first line-widths PW1, CW1 respectively, and the sixth line-widths PW6, CW6 of second exposure pattern 224b are equal to or approximate the second line-widths PW2, CW2 respectively. Therefore, the line widths of the first exposure pattern 224a are equal to or approximate the line widths of the second exposure pattern 224b before the developing step and after the developing step when the comb patterns 228 block the developer during the developing process.

Figure 9A:
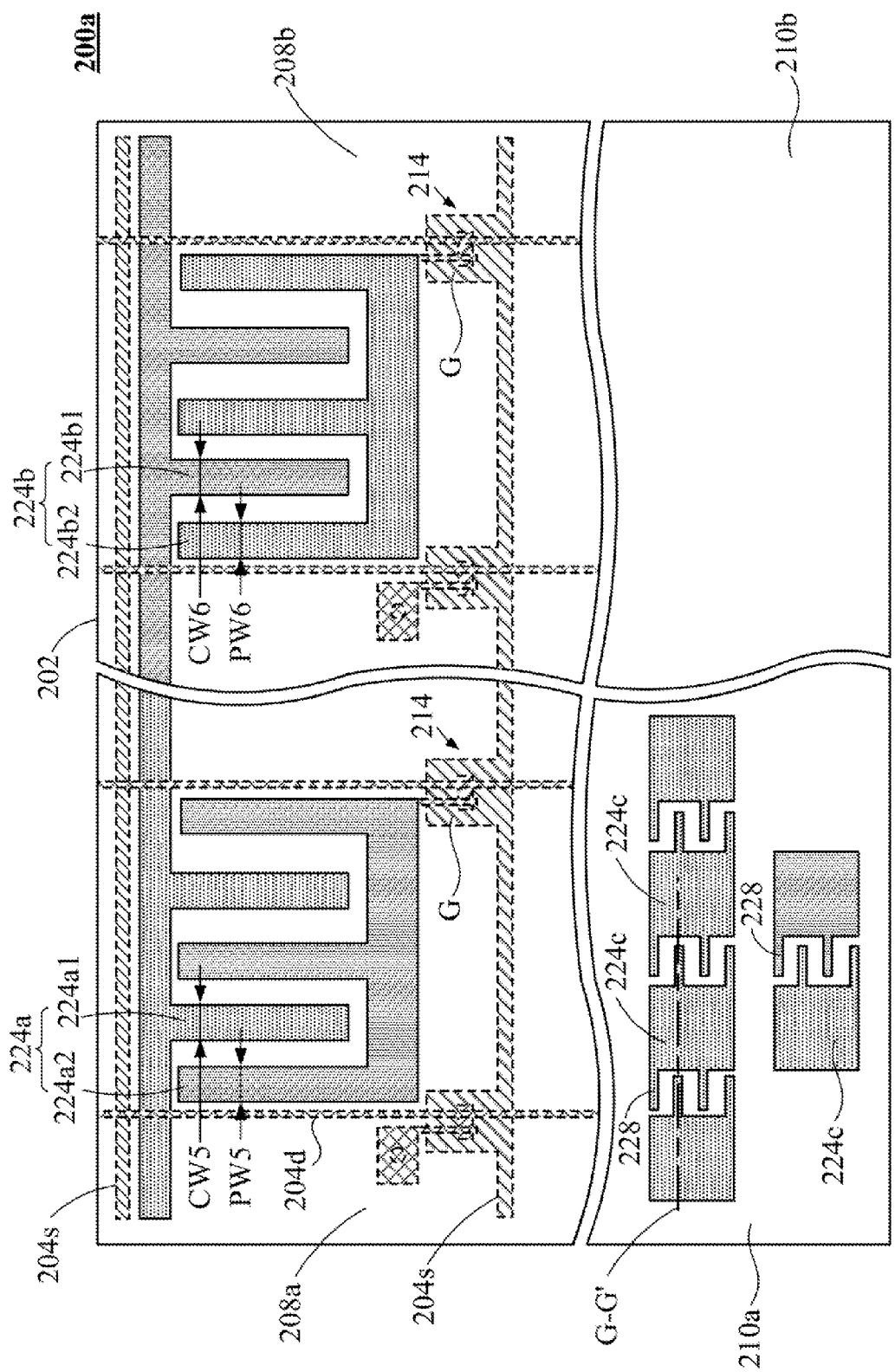
FIG. 9A is a schematic circuit layout view of etching the transparent conducting layer of the array substrate according to the first embodiment of the present invention.
Figure 9B:
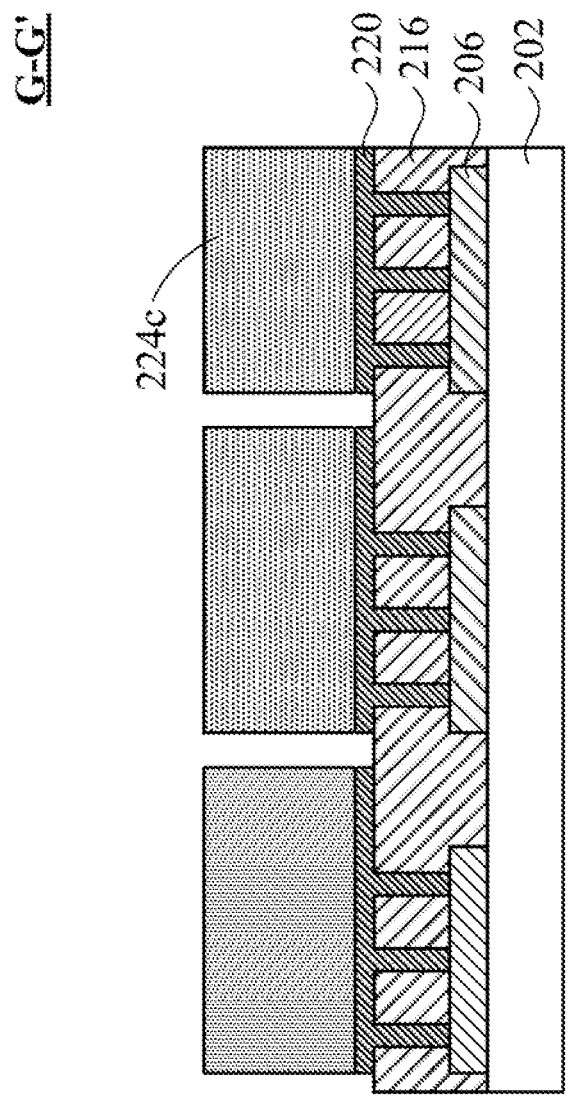
FIG. 9B is a schematic cross-sectional view of manufacturing process of the array substrate along line G-G' shown in FIG. 9A according to the first embodiment of the present invention.

FIG. 9A is a schematic circuit layout view of etching the transparent conducting layer 220 of the array substrate 200a according to the first embodiment of the present invention. FIG. 9B is a schematic cross-sectional view of manufacturing process of the array substrate 200a along line G-G' shown in FIG. 9A according to the first embodiment of the present invention. The transparent conducting layer 220 is etched to expose a portion of passivation layer 216 by using the first exposure pattern 224a, the second exposure pattern 224b and the third exposure patterns 224c as etching masks.

Figure 10A:
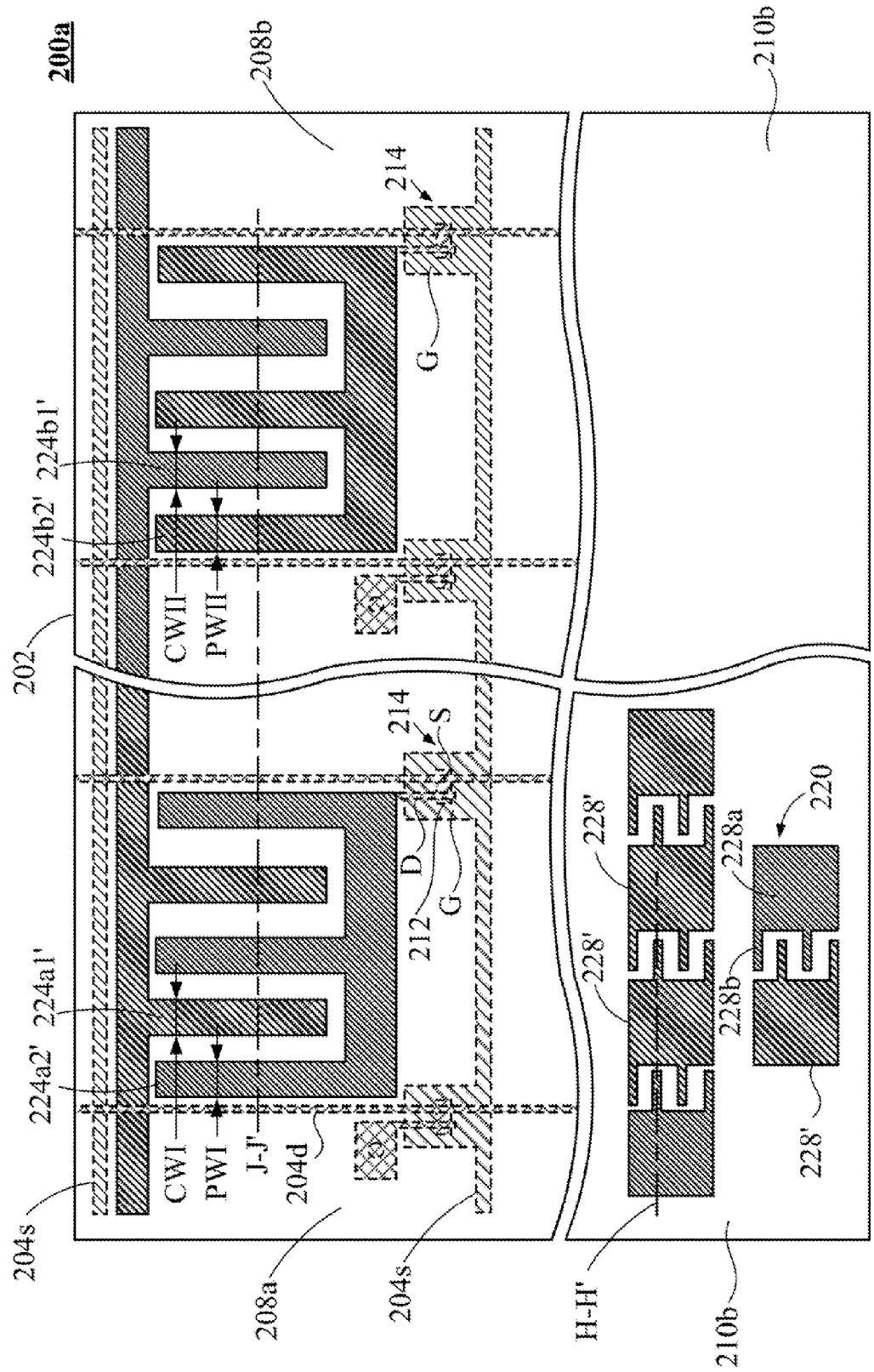
FIG. 10A is a schematic circuit layout view of removing the exposed photoresist layer of the array substrate according to the first embodiment of the present invention.
Figure 10B:
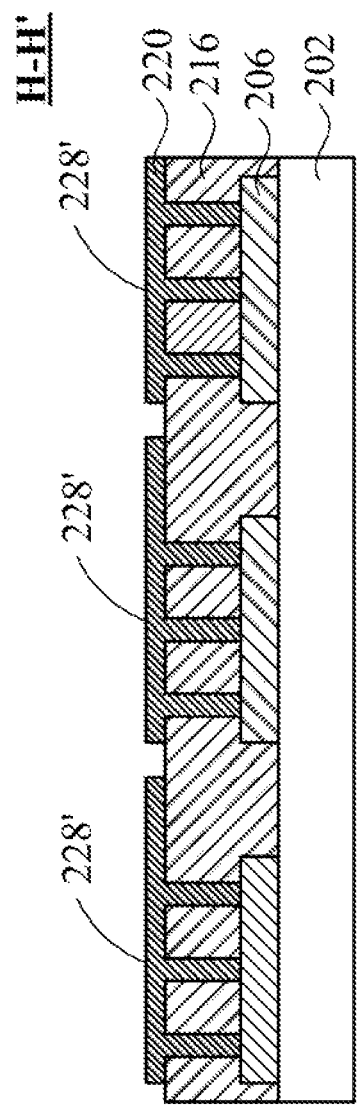
FIG. 10B is a schematic cross-sectional view of manufacturing process of the array substrate along line H-H' shown in FIG. 10A according to the first embodiment of the present invention.

FIG. 10A is a schematic circuit layout view of removing the exposed photoresist layer 222 of the array substrate 200a according to the first embodiment of the present invention. FIG. 10B is a schematic cross-sectional view of manufacturing process of the array substrate 200a along line H-H' shown in FIG. 10A according to the first embodiment of the present invention. The first exposure pattern 224a, the second exposure pattern 224b and the third exposure patterns 224c are removed to form the first pixel electrode 224a2', the first common electrode 224a1', the second pixel electrode 224b2' and the second common electrode 224b1' on the first display region 208a and the second display region 208b and to form the top contact pads 228' on the first non-display region 210a, wherein the widths PWI, CWI of first pixel electrode 224a2' and the first common electrode 224a1 either are equal to or approximate the fifth line-widths PW5, CW5 respectively.

The widths PWII, CWII of second pixel electrode 224b2' and the second common electrode 224b1' either are equal to or approximate the sixth line-widths PW6, CW6 respectively. In one embodiment, the width difference between first pixel electrode 224a2' and second pixel electrode 224b2' is less than 0.1 μm or arbitrary predetermined value and the width difference between first common electrode 224a1' and second common electrode 224b1' is less than 0.1 μm or arbitrary predetermined value, which can improve the mura of the LCD panel. Specifically, the width of first pixel electrode 224a2' is equal to or approximates that defined by the first exposure pattern 224a after completing the developing step and the width of second pixel electrode 224b2' is equal to or approximates that defined by the second exposure pattern 224b after completing the developing step.

As shown in FIG. 10A and FIG. 10B, the array substrate 200a of the present invention include a substrate 202, a plurality of scan lines 204s, a plurality of data lines 204d, a plurality of bottom contact pads 206, a passivation layer 216 and a transparent conducting layer 220. The substrate 202 has a first display region 208a, a second display region 208b and a first non-display region 210a. The scan lines 204s are disposed on the first display region 208a and the second display region 208b of the substrate 202. The data lines 204d are disposed on the first display region 208a and the second display region 208b wherein each of the data lines 204d are insulatedly interlaced with each of the scan lines 204s to form an interlaced position on which a transistor 214 disposes. The bottom contact pads 206 are disposed on the first non-display region 210a of the substrate 202. The passivation layer 216 is disposed on the substrate 202 for covering the scan lines 204s, the data lines 204d, the transistors 214 and the bottom contact pads 206.

The transparent conducting layer 220 is disposed on the passivation layer 216 and has a first pixel electrode 224a2', a first common electrode 224a1', a second pixel electrode 224b2', a second common electrode 224b1' and a plurality of top contact pads 228', wherein the first pixel electrode 224a2', the first common electrode 224a1', the second pixel electrode 224b2' and the second common electrode 224b1' are disposed on the first display region 208a and the second display region 208b, and the top contact pads 228' are disposed in the first non-display region 210a and electrically connected to the bottom contact pads 206. The top contact pads 228' are insulated each other. The first pixel electrode 224a2' in the first display 208a corresponds to the top contact pads 228' in the first non-display region 210a.

In one embodiment, the passivation layer 216 further includes a plurality of via holes (as shown in FIG. 5B) corresponding to the bottom contact pads 206 so that the transparent conducting layer 220 fills the via hole 218 and electrically connects the top contact pad 228' to the bottom contact pads 206. Further, each of the top contact pads 228' further a main body 228a and a plurality of blocking remainders or comb portions 228b. The main body 228a is connected to one of the bottom contact pads 206. The comb portions 228b are extended from the main body 228a for insulatedly interdigitating the comb portions 228b in one top contact pad 228' to the comb portions 228b in another top contact pad 228'.

Figure 11A:
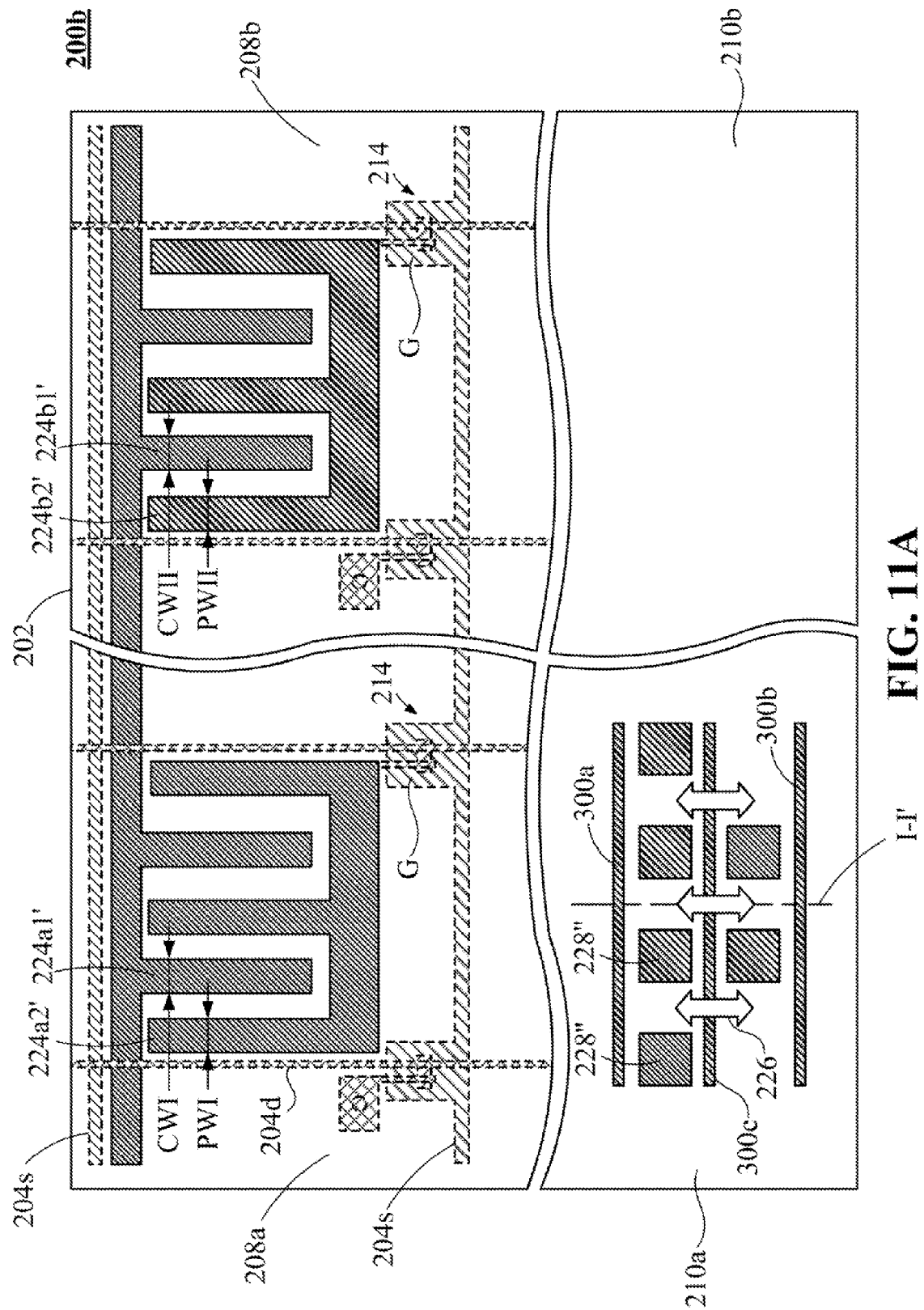
FIG. 11A is a schematic circuit layout view of the substrate of the array substrate according to a second embodiment of the present invention.
Figure 11B:
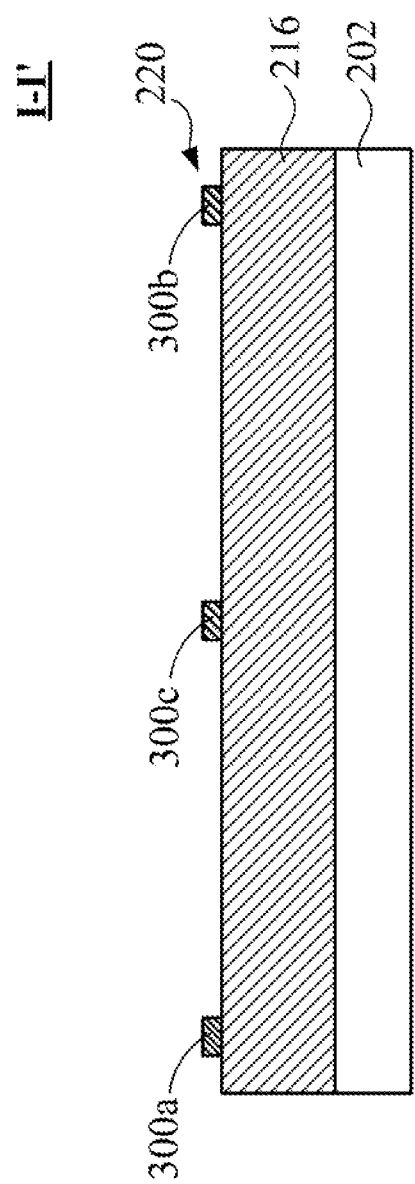
FIG. 11B is a schematic cross-sectional view of the array substrate along line I-I' shown in FIG. 11A according to the second embodiment of the present invention.

FIG. 11A is a schematic circuit layout view of the substrate of the array substrate 200b according to a second embodiment of the present invention. FIG. 11B is a schematic cross-sectional view of the array substrate 200b along line I-I' shown in FIG. 11A according to the second embodiment of the present invention. The array substrate 200b is similar to the array substrate 200a in FIG. 10A. The difference of array substrate 200b is that the transparent conducting layer 220 in the first non-display region 210a is etched to form the blocking remainder or first wall remainder 300a by using a portion of the third exposure patterns 224c as etching mask and the first wall remainder 300a is disposed between the first pixel electrode 224a2' and the top contact pads 228'', i.e. between the first display region 208a and the first non-display region 210a. For example, the first wall remainder 300a is disposed between the top contact pads 228'' which are perpendicular to the flow direction 226. A portion of third exposure patterns 224c over the first wall remainder 300a slightly blocks the developer during the developer flow process so that the developer cannot rapidly flow along the direction 226 on the top contact pads 228'' and the developer can uniformly flow on the third exposure patterns 224c of the first wall remainder 300a from the first non-display region 210a to the first display region 208a. In one embodiment, the profile of the top contact pads 228'' is the same as the profile of the main body 228a.

Similarly, the transparent conducting layer 220 further includes other blocking remainders, such as a second wall remainder 300b and a third wall remainder 300c which are a portion of the third exposure patterns 224c. The second wall remainder 300b is disposed around the top contact pads 228'' and near a side edge of the substrate 202 and the third wall remainder 300c is disposed between the top contact pads 228''. The second wall remainder 300b and the third wall remainder 300c have the same function as the first wall remainder 300a for facilitating the uniform flow of the developer to the first display region 208a. The array substrate 200b in the present invention includes one of the first wall remainder 300a, the second wall remainder 300b and the third wall remainder 300c, or the combinations. The first wall remainder 300a, the second wall remainder 300b and the third wall remainder 300c are insulatedly interlaced with the top contact pads 228''. The manufacturing method of the array substrate 200b is similar to that of the array substrate 200a.

Figure 12:
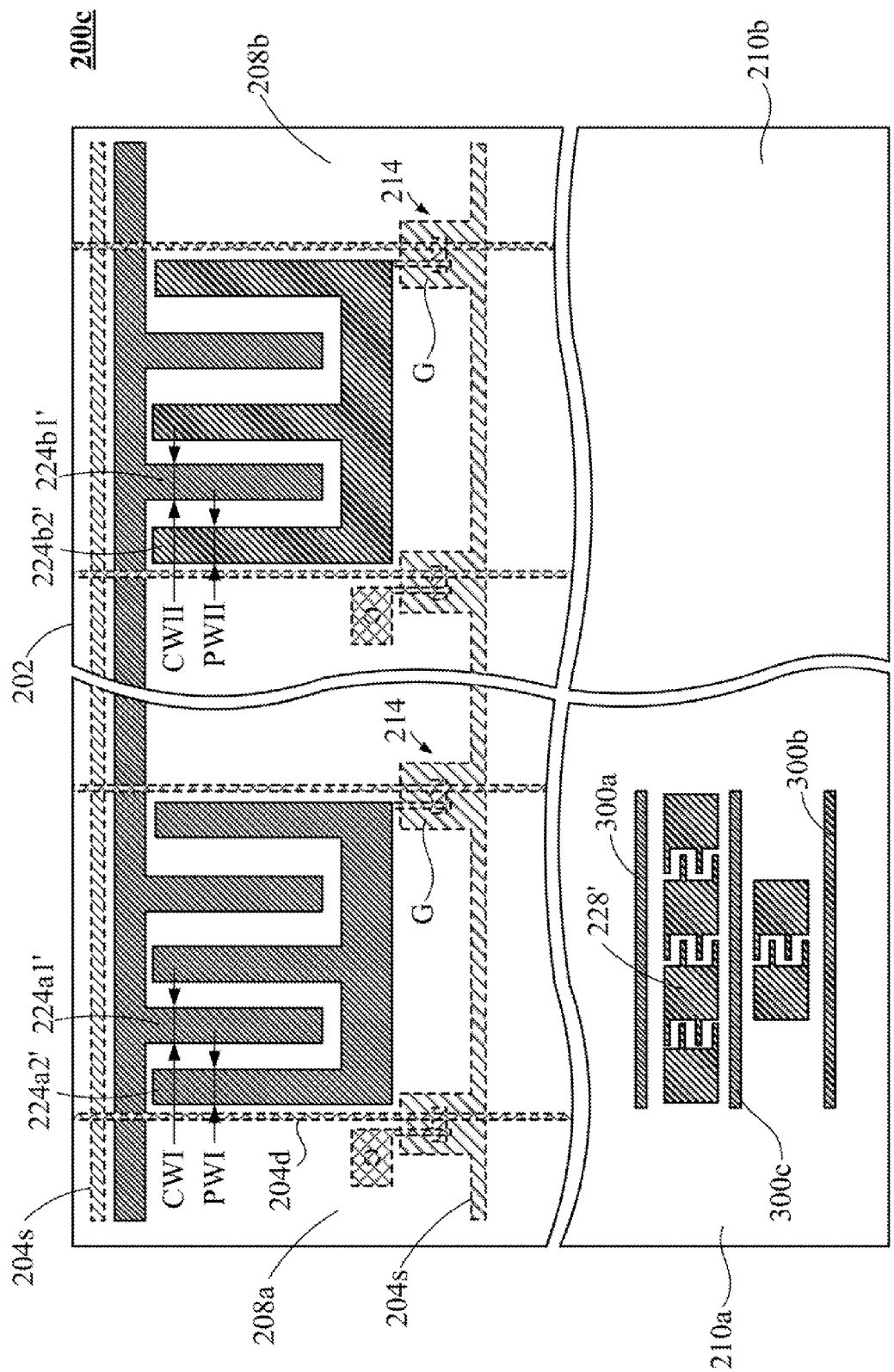
FIG. 12 is a schematic circuit layout view of the array substrate according to a third embodiment of the present invention.

FIG. 12 is a schematic circuit layout view of the array substrate 200c according to a third embodiment of the present invention. The array substrate 200c having the features of array substrate 200a and array substrate 200b includes top contact pads 228', the first wall remainder 300a, the second wall remainder 300b and the third wall remainder 300c. The manufacturing method of the array substrate 200c is similar to that of the array substrate 200a. The first wall remainder 300a is disposed between the first pixel electrode 224a2', the first common electrode 224a1' and the top contact pads 228'. The second wall remainder 300b is disposed around the top contact pads 228' and near a side edge of the substrate 202. The third wall remainder 300c is disposed between the top contact pads 228'.

Figure 13:
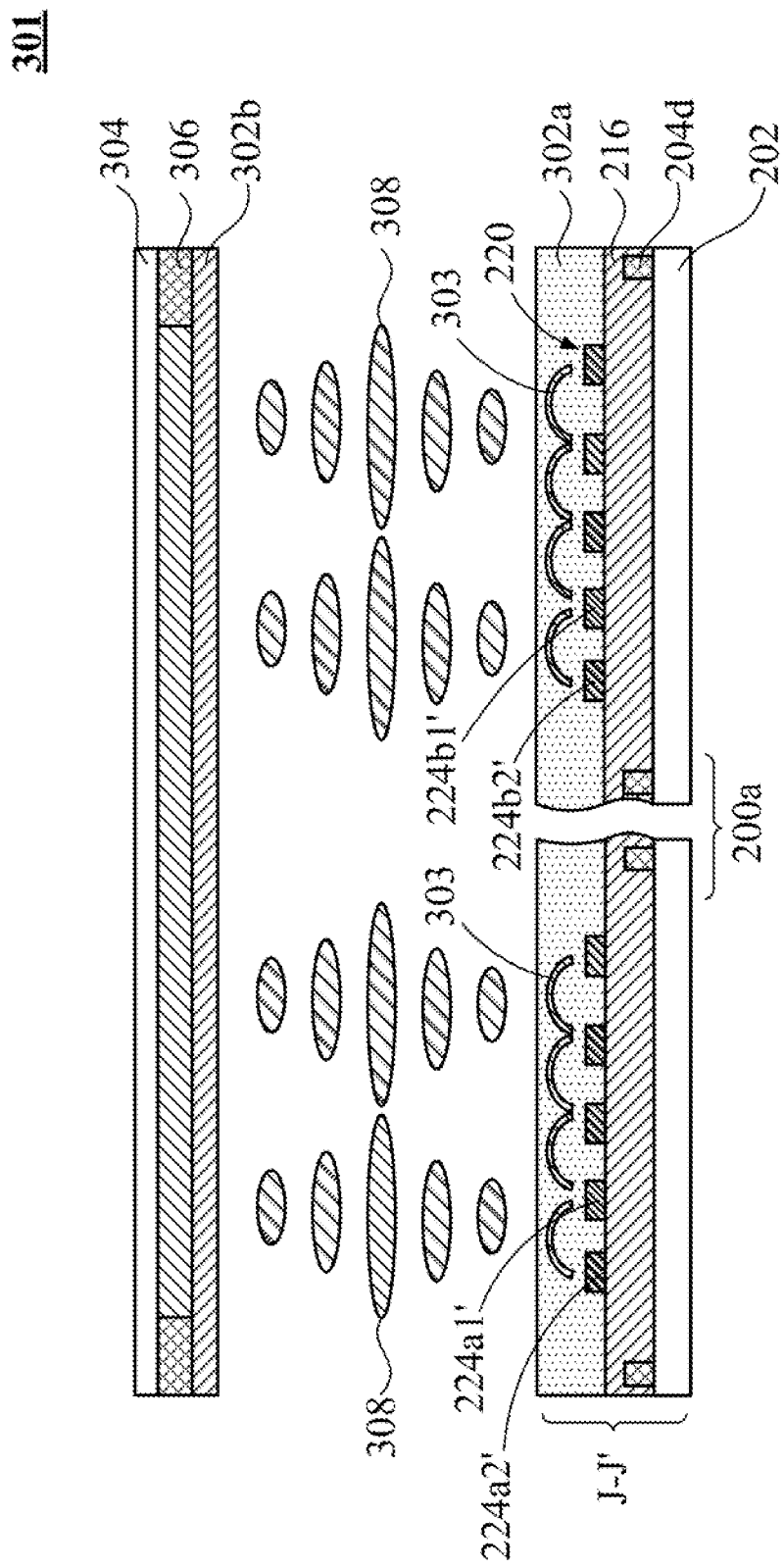
FIG. 13 is a schematic cross-sectional view of the LCD with array substrate along line J-J' shown in FIG. 10A according to one embodiment of the present invention.

FIG. 13 is a schematic cross-sectional view of the LCD 301 with array substrate 200a, 200b, 200c according to one embodiment of the present invention. An example of array substrate 200a along line J-J' shown in FIG. 10A is taken. The liquid crystal display (LCD) panel 301 includes an array substrate 200a, a bottom alignment layer 302a, a substrate 304, a color filter 306, a top alignment layer 302b and a liquid crystal 308. The bottom alignment layer 302a is disposed on the first common electrode 224a1', the second common electrode 224b1', the first pixel electrode 224a2' and the second pixel electrode 224b2' of the transparent conducting layer 220. The first common electrode 224a1', the second common electrode 224b1', the first pixel electrode 224a2' and the second pixel electrode 224b2' are used to generate uniform electrical field 303. The color filter 306 is disposed on the substrate 304. The top alignment layer 302b is disposed on the color filter 306. The liquid crystal 308 is disposed between the bottom alignment layer 302a and the top alignment layer 302b. The array substrates 200a, 200b, 200c are applicable to the LCD with in-plane switching mode or different types of LCDs.

According to the above-mentioned descriptions, the present invention provides an array substrate, liquid crystal display (LCD) with the array substrate and the manufacturing method thereof. While a developing step is performed on manufacturing process of the LCD panel, the developer uniformly flow on the exposure patterns for equalizing the line widths of the pixel electrodes to generate uniform electrical field so as to prevent the developer concentration to solve the problem of mura, i.e. unbalanced brightness, in the LCD panel.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An array substrate, comprising:
   a substrate having a first display region, a second display region and a first non-display region;
   a plurality of bottom contact pads disposed on the first non-display region of the substrate;
   a passivation layer disposed on the substrate for covering the bottom contact pads; and
   a transparent conducting layer disposed on the passivation layer and having a plurality of top contact pads disposed in the first non-display region and electrically connected to the bottom contact pads;
   wherein each of the top contact pads comprises:
   a main body; and
   a plurality of comb portions extending from the main body, wherein the comb portions in one top contact pad of the top contact pads are insulatedly interdigitated to the comb portions in another top contact pad of the top contact pads.

2. The array substrate of claim 1, further comprising:
   a plurality of scan lines disposed on the first display region and the second display region of the substrate; and
   a plurality of data lines disposed on the first display region and the second display region.

3. The array substrate of claim 1, wherein the passivation layer further comprises a plurality of via holes corresponding to the bottom contact pads.

4. The array substrate of claim 3, wherein the transparent conducting layer fills the via holes.

5. The array substrate of claim 1, wherein the top contact pads are insulated each other.

6. The array substrate of claim 1, wherein the bottom contact pads are insulated each other.

7. The array substrate of claim 1, wherein the transparent conducting layer further comprises:
   a first pixel electrode and a first common electrode disposed on the first display region; and
   a second pixel electrode and a second common electrode disposed on the second display region.

8. The array substrate of claim 7, wherein the transparent conducting layer further comprises a first wall remainder disposed between the first pixel electrode, the first common electrode and the top contact pads.

9. The array substrate of claim 8, wherein the transparent conducting layer further comprises a second wall remainder disposed around the top contact pads and near a side edge of the substrate.

10. The array substrate of claim 9, wherein the transparent conducting layer further comprises a third wall remainder disposed between the top contact pads.

11. The array substrate of claim 7, wherein the first pixel electrode and the first common electrode in the first display region correspond to the top contact pads in the first non-display region.

12. An array substrate, comprising:
   a substrate having a first display region, a second display region and a first non-display region;
   a plurality of bottom contact pads disposed on the first non-display region of the substrate;
   a passivation layer disposed on the substrate for covering the scan lines, the data lines, the transistors and the bottom contact pads; and
   a transparent conducting layer disposed on the passivation layer and having a plurality of top contact pads disposed in the first non-display region and electrically connected to the bottom contact pads;
   wherein the transparent conducting layer further comprises a plurality of wall remainders interlaced with the top contact pads.

13. The array substrate of claim 12, wherein each of the top contact pads further comprises:
   a main body connected to one of the bottom contact pads; and
   a plurality of comb portions extending from the main body, wherein the comb portions in one top contact pad of the top contact pads are insulatedly interdigitated to the comb portions in another top contact pad of the top contact pads.

14. A liquid crystal display (LCD) panel, comprising:
   an array substrate, comprising:
      a substrate having a first display region, a second display region and a first non-display region;
      a plurality of bottom contact pads disposed on the first non-display region of the substrate;
      a passivation layer disposed on the substrate for covering the scan lines, the data lines, the transistors and the bottom contact pads; and
      a transparent conducting layer disposed on the passivation layer and having a plurality of top contact pads disposed in the first non-display region and electrically connected to the bottom contact pads, wherein each of the top contact pads comprises a main body and a plurality of blocking remainders which are disposed in the first non-display region and extend from the main body as a plurality of comb portions;
   a bottom alignment layer disposed on the transparent conducting layer;
   a color filter disposed on a substrate corresponding to the array substrate;
   a top alignment layer disposed on the color filter; and
   a liquid crystal disposed between the bottom alignment layer and the top alignment layer.

15. The LCD panel of claim 14, wherein the top contact pads are insulated each other.

16. The LCD panel of claim 14, wherein the transparent conducting layer further comprises:
   a first pixel electrode and a first common electrode disposed on the first display region; and
   a second pixel electrode and a second common electrode disposed on the second display region.

17. The LCD panel of claim 16, wherein the blocking remainders insulatedly interlaced with the top contact pads are disposed between the first pixel electrode, the first common electrode and the top contact pads as wall remainders.

18. The LCD panel of claim 16, wherein the first pixel electrode and the first common electrode in the first display region correspond to the top contact pads in the first non-display region.

19. The LCD panel of claim 14, wherein each of the top contact pads further comprises:
   the main body connected to one of the bottom contact pads; and
   the blocking remainders extending from the main body as the comb portions, wherein for insulatedly interdigitated the comb portions in one top contact pad of the top contact pads are insulatedly interdigitated to the comb portions in another top contact pad of the top contact pads.

* * * * *